United States Patent [19]

Smith

[11] Patent Number: 4,955,754
[45] Date of Patent: Sep. 11, 1990

[54] SHOCK ABSORBING DEVICE FOR A PAVING MACHINE

[75] Inventor: Donald W. Smith, Aurora, Ill.

[73] Assignee: Barber-Greene Company, DeKalb, Ill.

[21] Appl. No.: 467,640

[22] Filed: Jan. 19, 1990

[51] Int. Cl.⁵ ............................................. E01C 19/18
[52] U.S. Cl. ..................................... 404/108; 293/134
[58] Field of Search ................ 404/108; 293/104, 125, 293/134

[56] References Cited

U.S. PATENT DOCUMENTS 4,332,505  6/1982  Mauldin .............................. 404/108
4,818,139  4/1989  404 ........................................... 81/

OTHER PUBLICATIONS

Cedarapids Inc. Sales Manual, Section 2, Division 7, Form 19116 (9/89) (two pp.).
Cedarapids Inc. Forms 19103-1-CR-09/89, 19103-2-CR-09/89, and 19103-3-CR-09/89; "Functional Description Traction and Drives MS3", (collectively three pp.).
Cedarapids Inc. Form 19103-4-CR-09/89, "Comparison MS3", (one p.).
Donald W. Smith, sketch of Cedarapids Shock Absorber, Nov. 3, 1989.
The Barber-Greene Edge (Fall, 1987, Issue).
Barber-Green Technical Bulletin No. T-7420, "Producing Smoother Pavements with Longer Asphalt Paver Screed", by Earl D. Martenson (1988).

Primary Examiner—William P. Neuder
Attorney, Agent, or Firm—Jones, Day, Reavis & Pogue

[57] ABSTRACT

The invention is a device for cushioning the contact between a paving machine equipped with a hopper for receiving paving material and a truck carrying paving material to be dumped into the hopper. In one embodiment the device has an arm with one end pivotally connected to the paving machine; the other endDoffth ajm Beajs ollerRfoo clnttcttnggthh ttrex oo tte ruwk..Thh ajm s coonegtee t tte issonnoffa yddauuicc-cyyinnerrsyten; as the roller contacts the truck tires, the fluid of the hydraulic system cushions the contact between the roller and the tires. The hydraulic system includes a pump for returing the piston (and thus the roller) to an extended position and an adjustable pressure hydraulic valve, controllable by the operator of the paving machine, for modulating the force exerted on the paving machine and on the tires while the roller is in contact with the tires. The device may also be equipped with a latch, releasable by the operator of the paving machine, for holding the piston (and thus the roller) in a retracted position to reduce the tendency of the truck tires to bounce ahead of the paver.

24 Claims, 7 Drawing Sheets

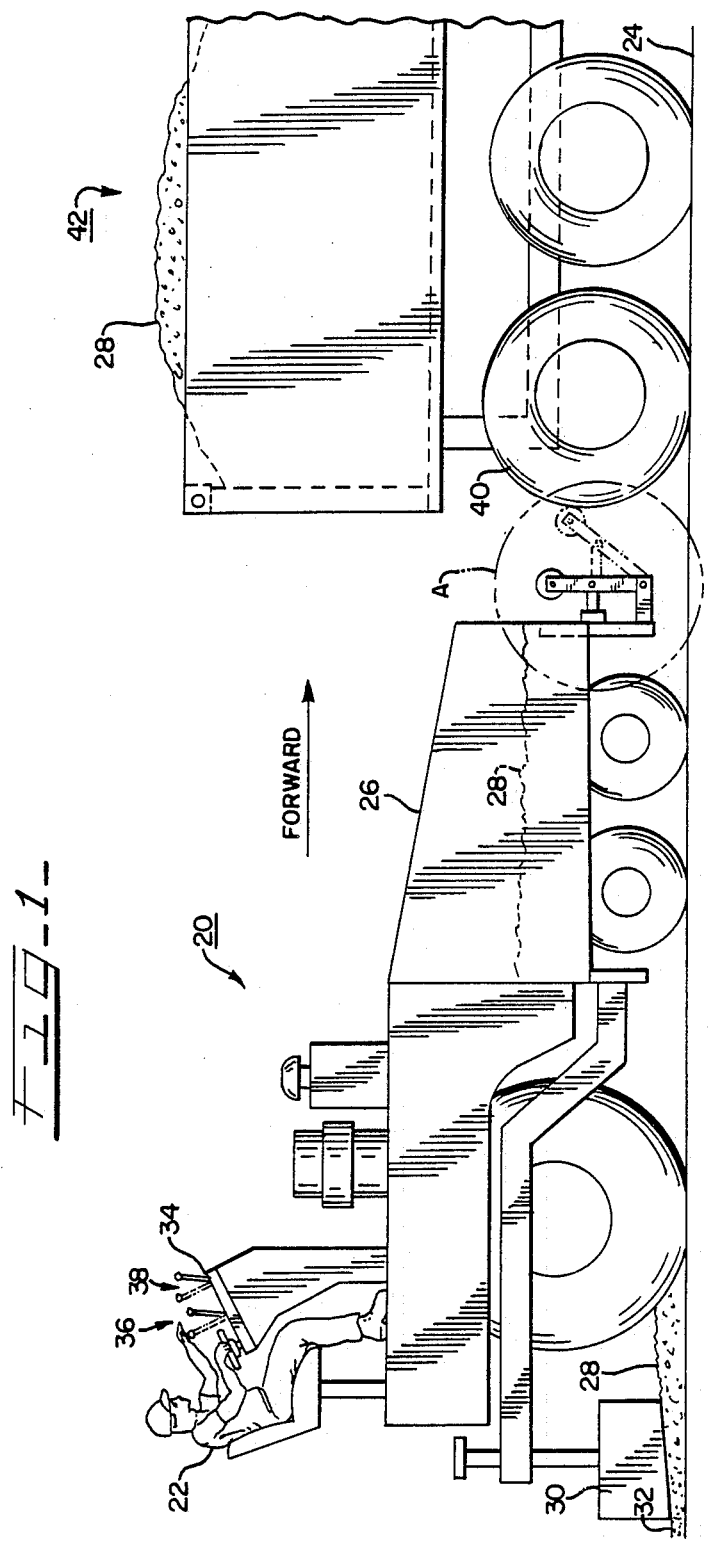

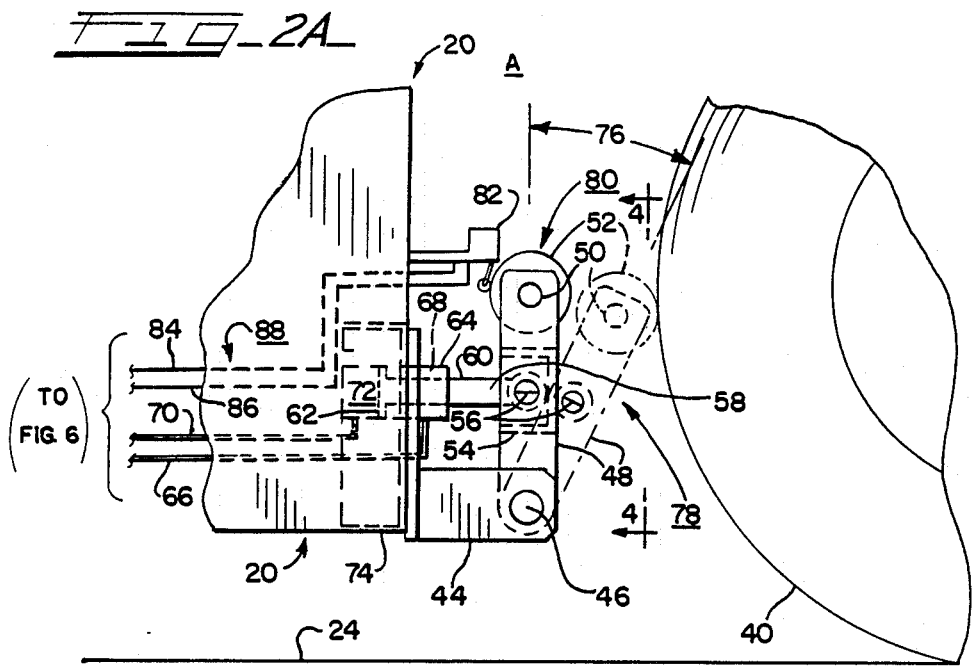
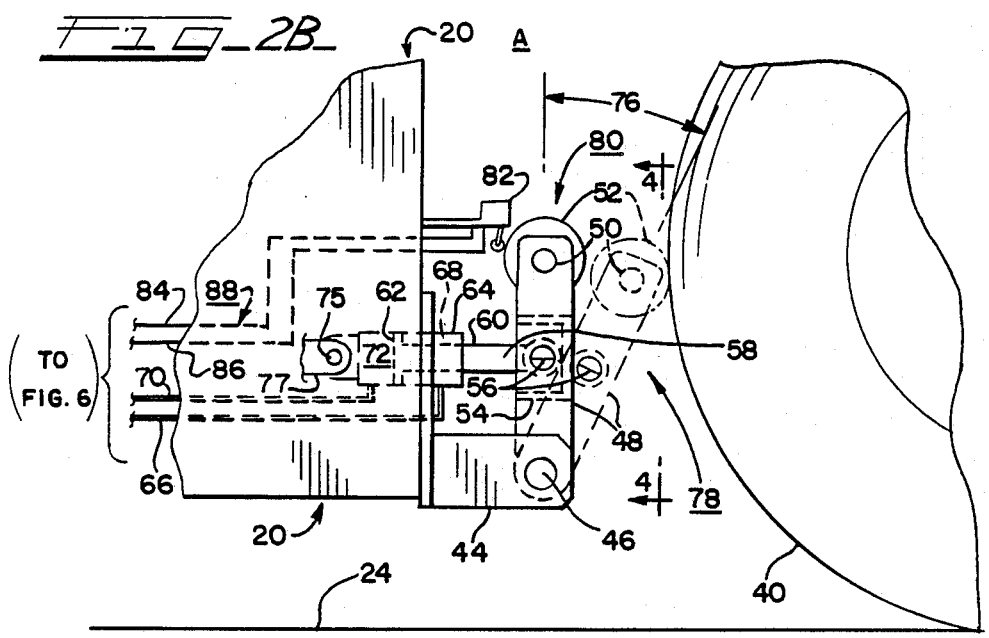

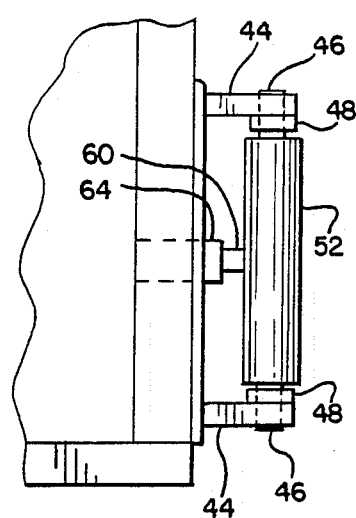
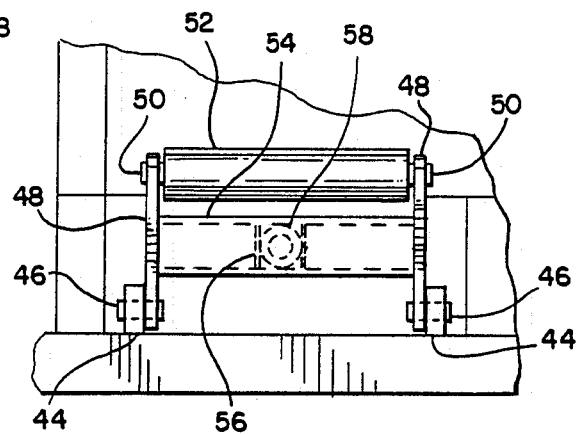
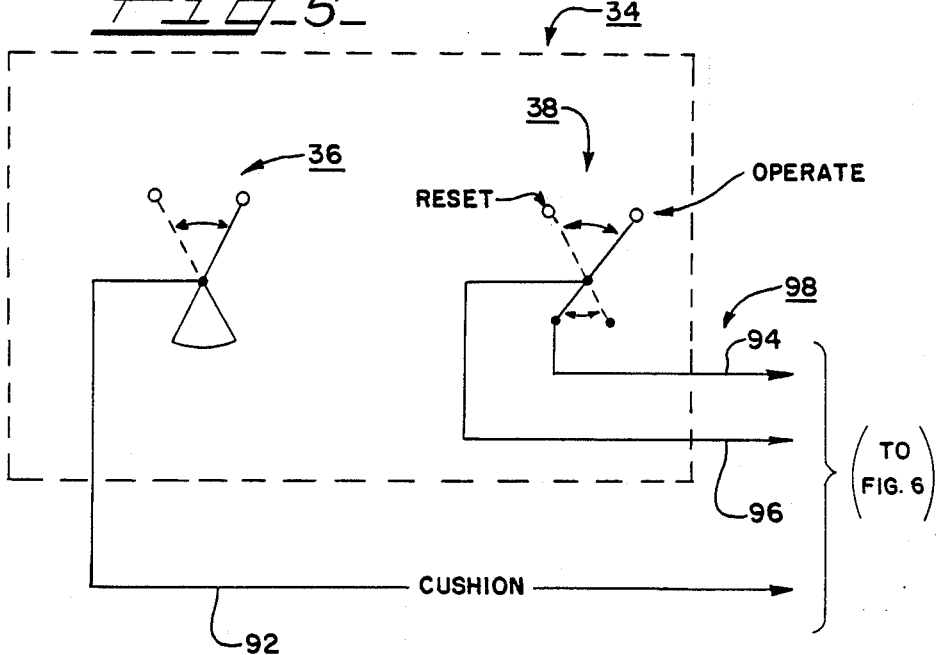

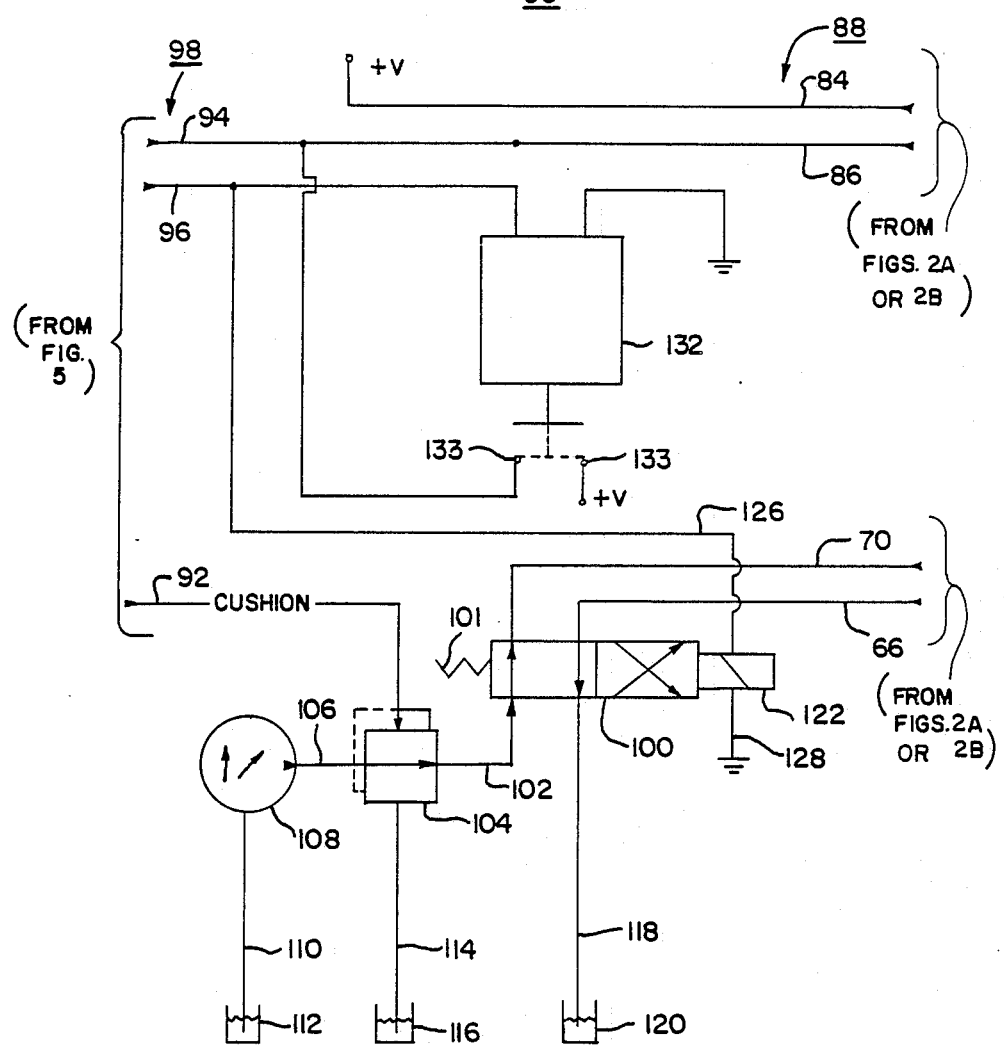

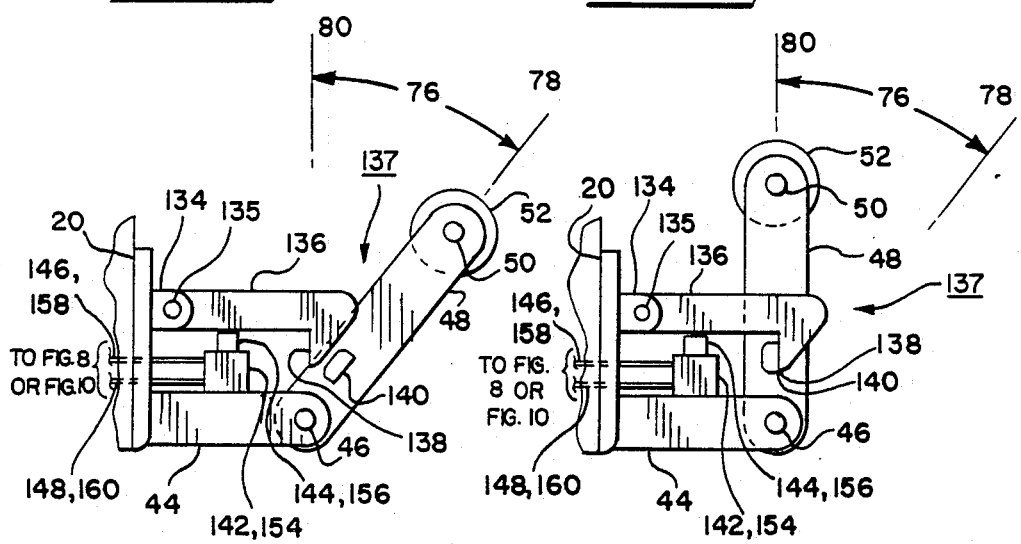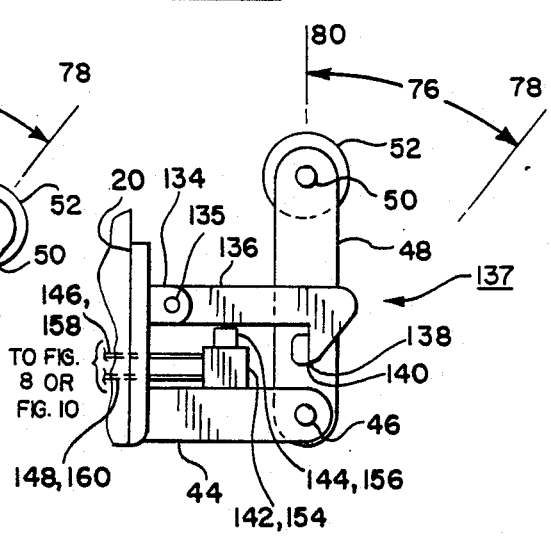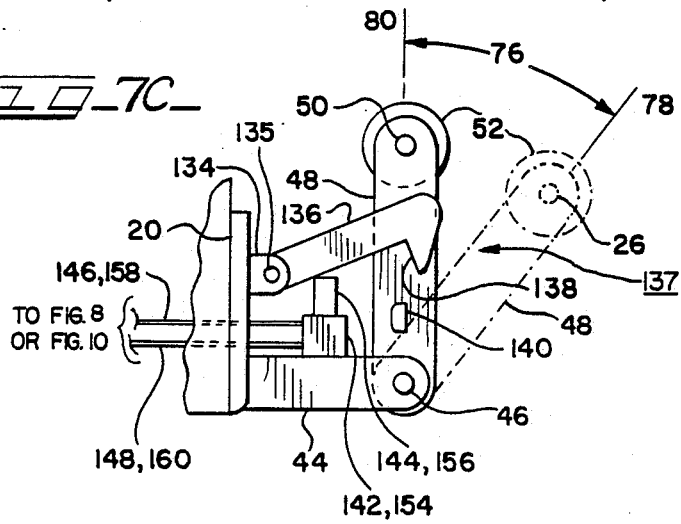

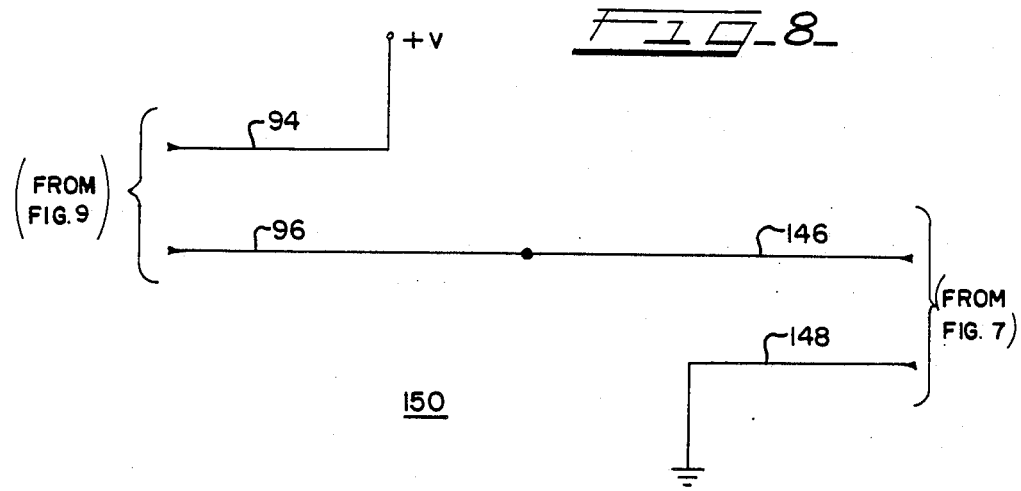
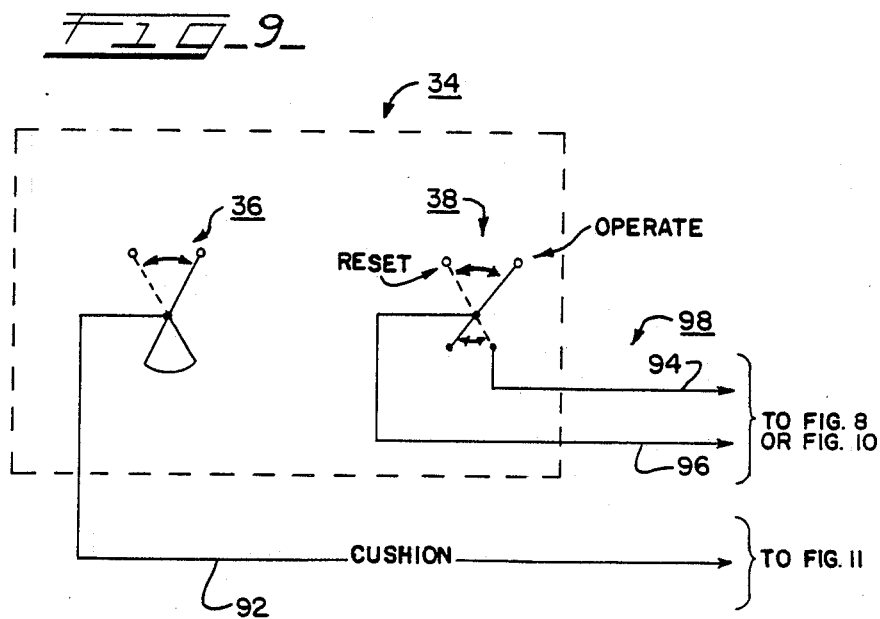

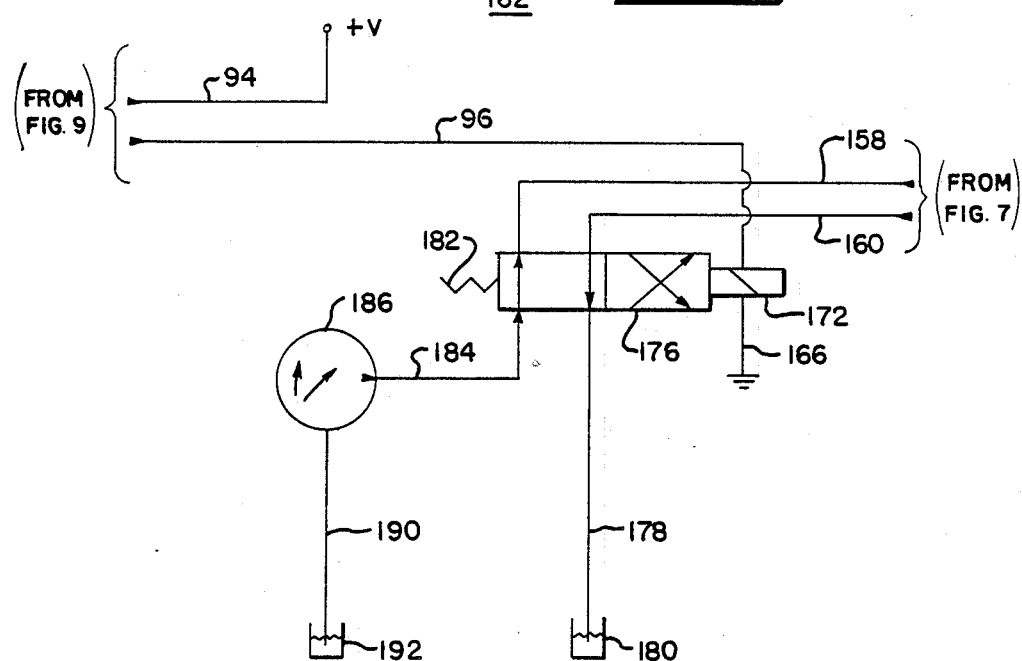
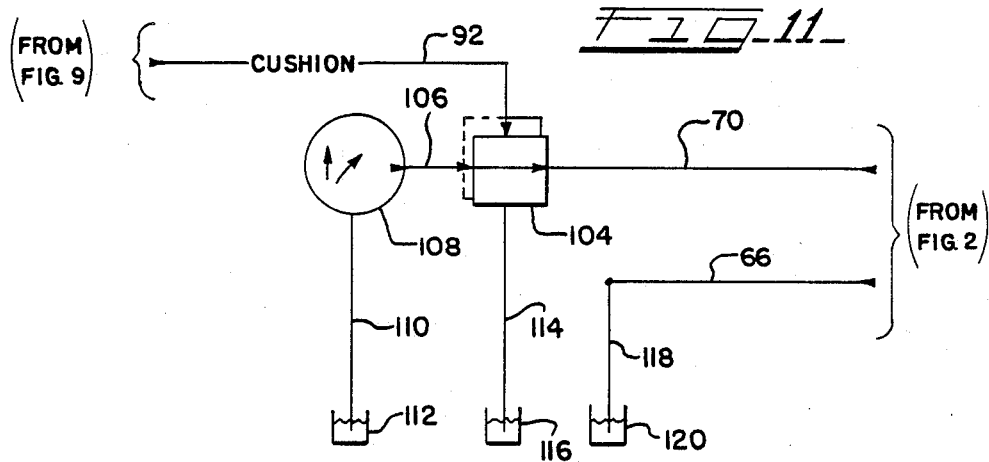

SHOCK ABSORBING DEVICE FOR A PAVING MACHINE

BACKGROUND OF THE INVENTION

Self-propelled asphalt pavers having a "floating" screed ("asphalt pavers" or "pavers") are widely used for laying down asphalt pavement for highways, airplane runways, parking lots, and other construction applications. A major advantage of asphalt pavers is that they can produce a relatively smooth asphalt surface.

Asphalt pavers are usually equipped with a hopper for holding paving material which the asphalt paver is to lay down. This hopper must be reloaded with new paving material if the volume of paving material to be laid down exceeds the capacity of the hopper, as is usually the case. Three common ways of reloading the hopper have evolved.

First, a truck carrying paving material dumps the paving material on the surface over which the asphalt paver will travel. An elevating machine (which may or may not be propelled by or connected to the asphalt paver) then picks up the paving material from the surface and transfers the paving material to the hopper. The asphalt paver eventually paves over the surface on which the paving material was dumped and thus paves over any material on the surface which was not picked up and transferred to the hopper. This first approach has the disadvantage of requiring an elevating machine to pick up the paving material from the surface on which the truck dumped it and to transfer it to the hopper.

Second, a truck dumps paving material into the hopper of a transfer machine which is itself not connected to the asphalt paver. The transfer machine feeds paving material from its hopper to the hopper of the asphalt paver, typically by means of a drag flight conveyor. This second approach has the disadvantage, particularly on smaller jobs, of requiring a separate transfer machine, which also requires its own operator.

Third, a truck dumps paving material directly into the hopper of an asphalt paving machine. This third, direct-reloading approach avoids the need for the additional machine required in the first (the elevating machine) and the second (the transfer machine) approaches discussed above.

In this third approach the asphalt paver can stop moving forward while the dump truck backs up and then dumps paving material into the hopper. But completely stopping the asphalt paver while the paving material is dumped and then starting the paver moving forward again can change the balance of forces on the "floating" screed and thereby cause the screed to make a bump and/or an indentation in the pavement being laid down.

The asphalt paver will lay down much smoother pavement if it does not stop but instead remains in continuous forward motion while the dump truck reloads the hopper. Two approaches have evolved to deal with the problems of dumping the paving material directly from a truck into the hopper of an asphalt paver while the paver remains in continuous forward motion.

First, the front of the asphalt paver can be equipped with a push roller (which may be mounted on either end of a frame pivotally attached to the asphalt paver at the centerline of the asphalt paver, or which may be mounted directly on either side of the front of the asphalt paver) to contact the tires of the truck and to push the truck ahead of the asphalt paver while the asphalt paver remains in continuous forward motion and continues to lay down pavement. Although contact between the truck tire and a push roller is superior to raw contact between the asphalt paver and the truck tire, the jolt from the contact between the truck tire and a push roller can cause a jolt to the asphalt paver which may disturb the balance of forces on the screed and cause a bump and/or an indentation in the pavement being laid down. The jolt can also cause the truck to "bounce" ahead of the asphalt paver, which may also cause the truck to dump paving material on the ground ahead of the paver.

Often the asphalt paver slows down to a very slow forward speed before the push rollers contact the tires of the dump truck. But this substantial speed reduction can also change the balance of forces on the screed, causing a bump and/or an indentation in the pavement the paver is laying down.

Second, to prevent the truck from bouncing ahead of the asphalt paver, the truck wheels can be hitched to the asphalt paver with rim restraining rollers. While rim restraining rollers help keep the truck close to the paver, they do not help prevent an impact between the truck and paver that can disturb the smoothness of the asphalt surface the asphalt paver is laying down.

Thus, none of the alternatives of the prior art reliably accomplish the technical objective of permitting direct reloading of the hopper of an asphalt paver with paving material from a dump truck, while the asphalt paver remains in forward motion and continues to lay down pavement, without creating bumps and/or indentations in the pavement which the asphalt paver is laying down.

SUMMARY OF THE INVENTION

The invention accomplishes the technical objective just stated, and reduces (and may even eliminate) the disadvantages of the prior art, by cushioning and modulating the impact between the asphalt paver and the tires of the truck.

The invention provides contacts (in one embodiment, rollers) which contact the tires of the truck as the asphalt paver advances. The contacts are connected to the asphalt paver (in one embodiment, by an arm, one end of which bears the rollers and the other end of which is pivotally mounted on the asphalt paver).

The invention also provides a cushioning system (in one embodiment, a hydraulic cylinder system) for cushioning the forces which arise when the contacts come in contact with the truck tires. The cushioning system is in turn connected to the contacts (in one embodiment, the free end of the piston of the hydraulic cylinder system is pivotally connected to the middle of the arm).

As the asphalt paver remains in continuous forward motion, after the contacts contact the truck tires, the cushioning system operates by cushioning the force which the contacts exert on the tires in the direction in which the paver is moving and also by cushioning the force which the contacts exert in the opposite direction on the asphalt paver. As a result of the cushioning system, the force rises gradually until the force is adequate to accelerate the truck to the same speed as the speed with which the asphalt paver is moving. The asphalt paver is not subjected to the sudden jolt of contact with the truck tires which is characteristic of the prior art techniques and which can cause a bump and/or an indentation in the pavement being laid down, and the tendency of the truck to bounce ahead from the same sudden jolts is reduced.

The invention also provides a force modulating system (in one embodiment, an adjustable pressure hydraulic valve in a line leading from the rear chamber of the hydraulic cylinder to a hydraulic fluid pump) which the operator of the asphalt paver can use to modulate the operation of the cushioning system. The forces on the asphalt paver, and on the truck tires, which arise while the contacts are contacting the truck tires can vary with, among other things, the weight of the asphalt paver, the speed at which it is moving while laying down pavement, and the weight of the truck with its supply of paving material. A cushioning effect which produces a good result for one set of conditions may not produce as good a result for another set of conditions. By using the force modulating system (in one embodiment, by adjusting the adjustable pressure control valve) the operator of the asphalt paver can adjust the cushioning effect to be appropriate for the conditions which exist when each individual load of paving material is to be dumped into the hopper of the asphalt paver.

The invention also provides a restoring system (in one embodiment, a hydraulic connection which causes the piston to extend the contacts) which enables the operator of the asphalt paver—without the assistance of a helper—to reset the contacts and the cushioning system so that they will work for the next load of construction material which is to be dumped into the hopper of the asphalt paver.

The invention also provides a latch system (in one embodiment, a solenoid-controlled hydraulic valve) to hold the contacts in a retracted position. The latch system prevents the contacts from recoiling in the direction in which the asphalt paver is moving. Thus, the latch system (1) prevents the cushioning system and/or the force modulating system from transmitting (through the contacts) to the truck tires a force which could cause the truck to bounce ahead of the asphalt paver, and (2) prevents the asphalt paver from experiencing (from the truck bouncing ahead of the paver) forces which could cause the asphalt paver to make a bump and/or an indentation in the asphalt surface which the asphalt paver is laying down. In combination with the cushioning system and the force modulating system, the latch system achieves a desirable improvement over the prior art techniques. The operator of the asphalt paver—also without the assistance of a helper—can release the latch system (in one embodiment, by throwing a switch) so that the latch system no longer holds the contacts in a retracted position. The latch release permits the restoring system to carry out its intended function.

The invention is not limited to any specific type of paving machine or to any specific type of paving material to be laid down by the paving machine. Thus, although the specific embodiments described herein concern asphalt paving machines which lay down asphalt-aggregate paving material, the invention may also be used in any type of paving machine which lays down any type of paving material. Such machines and paving materials include, but are not limited to, paving machines which lay down portland cement-aggregate paving material.

BRIEF DESCRIPTION OF THE DRAWINGS

FIG. 1 is a side view of an asphalt paver equipped with an embodiment of the invention having a hydraulic latch.

FIGS. 2A and 2B are a detailed view of area A of FIG. 1. FIG. 2A are an embodiment in which the hydraulic cylinder is mounted on the asphalt paver by means of a slide. FIG. 2B depicts a preferable embodiment in which the hydraulic cylinder is mounted on the asphalt paver by means of a pivot.

FIG. 3 is a top view of a portion of the embodiment depicted in FIGS. 1, 2A, and 2B, with certain parts not being shown for purposes of clarity.

FIG. 4 is a front view of a portion of the embodiment depicted in FIGS. 1, 2A, and 2B taken along the line 4—4 shown in FIGS. 2A and 2B, with certain parts not being shown for purposes of clarity.

FIG. 5 is a schematic diagram of the operator control station of the embodiment depicted in FIGS. 1, 2A, and 2B.

FIG. 6 is a schematic diagram of the hydraulic system unit of the embodiment depicted in FIGS. 1, 2A, and 2B (which includes a hydraulic latch).

FIGS. 7A, 7B, and 7C are simplified side views of an alternate embodiment of the invention having a mechanical latch and an electric solenoid (or, alternatively a hydraulic cylinder) latch release system.

FIG. 8 is a schematic diagram of the latch release control system used in the embodiment depicted in FIGS. 7A, 7B and 7C having an electric solenoid latch release system.

FIG. 9 is a schematic diagram of the operator control station for the embodiment depicted in FIGS. 7A, 7B and 7C having a hydraulic latch release system.

FIG. 10 is a schematic diagram of the latch release control system for the embodiment depicted in FIGS. 7A, 7B and 7C having a hydraulic latch release system.

FIG. 11 is a schematic diagram of a simplified hydraulic system unit which may be used with the embodiment having a mechanical latch as depicted in FIGS. 7A through 10.

DETAILED DESCRIPTION OF THE INVENTION

The following description of specific embodiments of the invention discusses asphalt paving machines which lay down asphalt-aggregate paving material. However, the invention may also be used in any type of paving machine which lays down any type of paving material. Such machines and paving materials include, but are not limited to, paving machines which lay down portland cement-aggregate paving material.

As shown in FIG. 1, a self-propelled asphalt paver 20 controlled by an operator 22 moves forward across a surface 24 which the paver 20 is to pave. The paver 20 is equipped with a hopper 26 which holds paving material 28 which the paver 20 will lay down behind it on the surface 24 as the paver 20 moves in the forward direction shown in FIG. 1 across the surface 24. The paver 20 is also equipped with a "floating" screed 30 (shown only schematically in FIG. 1) which controls the surface of the pavement 32 which the paver 20 is laying down. The operator 22 works at an operator station 34. The operator station 34 may be located anywhere on the paver 20. (The operator station 34 can be provided in duplicate: one operator station 34 on the left side, and one operator station 34 on the right side, of the paver 20. These duplicate positions of the operator station 34 are not shown in the drawings.) Although FIG. 1 shows a relatively small paver 20, the invention may be mounted on larger pavers, including pavers having a receiving hopper and a drag flight conveyor leading from that hopper to a separate paving material feeding hopper.

The operator station 34 is equipped with a cushion signal control 36 and a reset signal control 38, each of which may be operated by the operator 22 without leaving the operator station 34. These signal controls are depicted in schematic form in FIG. 5 (and in an alternative form in FIG. 9); the effects produced by these signal controls are described below in connection with FIGS. 5, 6, , 9, 10, and 11.

As the paver 20 moves forward across surface 24 it is about to make contact with the rear tires 40 of a truck (such as a dump truck 42), which has stopped on the surface 24 ahead of the paver 20. The dump truck 42 carries paving material 28 to be dumped into the hopper 26.

The parts of region A of FIG. 1 are depicted in greater detail in FIGS. 2A and 2B. FIGS. 2A and 2B, like FIG. 1, show a side view from the right-hand side of the asphalt paver 20. Those skilled in the art will understand that the embodiment of the invention depicted in FIGS. 1, 2A, and 2B, and depicted in a top view in FIG. 3 and in a front view in FIG. 4, is an embodiment of the invention located on the right-hand side of the asphalt paver 20; and that a corresponding structure is mounted on the left-hand side of the asphalt paver 20. Those of ordinary skill in the art will also understand that the control systems and hydraulic systems depicted in other figures are to be implemented in such a way as to control the embodiments of the invention located both on the right-hand side and on the left-hand side of the asphalt paver 20.

Those of ordinary skill in the art will also understand that the invention may contact parts of the truck 42 other than the tires 40. For simplicity, only an embodiment which contacts the tires 40 is shown.

As shown in FIGS. 2A, 2B, 3, and 4, the right-hand side of the paver 20 is equipped with a pair of ears 44 mounting respective pivot pins 46 to which corresponding ends of a pair of roller support arms 48 are pivotally attached. The other ends of the roller support arms 48 mount roller pivots 50, which hold a roller 52 The roller 52 is free to rotate around the roller pivots 50.

As shown in FIGS. 2A and 2B and in the front view of region A of the right-hand side of the paver 20 depicted in FIG. 4, a bar 54 has its opposite ends secured to the arms 48 intermediate the ends of the latter. The bar 54 is equipped with a piston pivot 56 for engaging the free end 58 of a piston rod 60. The opposite end 62 of piston 60 is received within a hydraulic cylinder 64; the piston 60 and the hydraulic cylinder 64 are both conventional in form.

As shown in FIGS. 2A and 2B, the hydraulic cylinder 64 is equipped with a front chamber hydraulic fluid line 66, which leads to the front chamber 68 of hydraulic cylinder 64 ahead of piston 60, and with a rear chamber hydraulic fluid line 70, which leads to the rear chamber 72 of hydraulic cylinder 64 behind the piston 60.

Two alternative ways of mounting the hydraulic cylinder 64 on the paver 20 are depicted in FIGS. 2A and 2B. As shown in FIG. 2A, the asphalt paver 20 is equipped with a hydraulic cylinder track 74, to which hydraulic cylinder 64 is attached and along which hydraulic cylinder 64 is free to slide vertically so that the piston 60 is always properly aligned within the hydraulic cylinder 64 as the free end 58 of piston 60 moves with the piston pivot 56 as the roller support arms 48 pivot about the respective roller support arm pivot pins 46.

A better way of mounting the hydraulic cylinder 64 on the paver 20 is depicted in FIG. 2B. Because slides such as the hydraulic cylinder track 74 tend to bind up, the hydraulic cylinder 64 is preferably attached to the paver 20 by a hydraulic cylinder pivot pin 75, which passes through a pair of hydraulic cylinder pivot pin ears 77 mounted on the paver 20. (For clarity FIG. 2B omits the precise mounting of the pair of ears 77 on the paver 20.) With such an attachment the hydraulic cylinder 64 is free to pivot about the hydraulic cylinder pivot pin 75 so that the piston 60 is always properly aligned within the hydraulic cylinder 64 as the hydraulic cylinder piston moves as described in connection with FIG. 2A.

Returning to the items which FIG. 2A and FIG. 2B have in common, the movement of the piston 60 and of the hydraulic cylinder 64 permits the roller support arms 48 to pivot through an arc 76 between an extended position 78 (shown in broken lines in FIGS. 2A and 2B) and a retracted position 80. In the extended position 78 the piston 60 has moved all or almost all the way forward in the hydraulic cylinder 64, but not so far as to close off the front chamber hydraulic fluid line 66. In the retracted position 80 the piston 60 has moved all or almost all the way back in the hydraulic cylinder 64, but not so far as to close off the rear chamber hydraulic fluid line 70.

The asphalt paver 20 is also equipped with a limit switch 82. The rear of the roller 52 contacts and trips the limit switch 82 when the roller support arms 48 reach the retracted position 80. When the limit switch 82 is tripped, it closes an electrical connection between the two lines 84 and 86 of a limit switch signal line 88. When the roller 52 does not force the limit switch 82 to a tripped position, the limit switch 82 opens the electrical connection between the lines 84 and 86.

The front chamber hydraulic fluid line 66, the rear chamber hydraulic fluid line 70, and the limit switch signal line 88 lead to a hydraulic system unit 90, which may be located anywhere on paver 20. (The hydraulic system unit 90 is not shown in FIGS. 1, 2A, or 2B but is shown in FIG. 6.)

FIG. 3 depicts a top view of the embodiment of the invention mounted on the right-hand side of the paver 20, as shown in FIGS. 1, 2A, and 2B. (For clarity, FIG. 3 omits the hydraulic fluid lines 66 and 70, the limit switch 82, the limit switch signal line 88, and the hydraulic cylinder track 74 or the hydraulic cylinder pivot pin 75 and ears 77.)

FIG. 4 depicts a front view of the embodiment of the invention mounted on the right-hand side of the paver 20, as shown in FIGS. 1, 2A, and 2B. The front view depicted in FIG. 4 is taken along the line 4—4 shown in FIGS. 2A and 2B. (For clarity, FIG. 4 omits the items omitted from FIG. 3.)

FIG. 5 is a schematic diagram showing in greater detail the cushion signal control 36 and the reset signal control 38 of the operator's station 34 depicted in FIG. 1. The cushion signal control 36 controls the state of the signal CUSHION in cushion signal control line 92, which leads from the operator station 34 to the hydraulic system unit 90 depicted in FIG. 6. The reset signal control 38 opens an electrical contact between lines 94 and 96 of a reset signal control line 98 when the reset signal control 38 is in the RESET position and closes that electrical contact when the reset signal control 38 is in the OPERATE position. The reset signal control line 98 also leads from the operator station 34 to the hydraulic system unit 90.

The hydraulic system unit 90 for the embodiment of the invention shown in FIGS. 1 through 5 is depicted in FIG. 6. FIG. 6 shows the way in which the three control signals of this embodiment of the invention—which are (1) the signal CUSHION in cushion signal control line 92; (2) the state of the reset signal control line 98 indicated by the presence or absence of electrical connection between the lines 94 and 96; and (3) the state of the limit switch signal line 88, indicated by the presence or absence of electrical connection between lines 84 and 86—interact to control the operation of the invention.

The signal CUSHION controls and modulates the hydraulic pressure in the rear chamber 72 of the hydraulic cylinder 64. As shown in FIG. 6, within the hydraulic system unit 90 the rear chamber hydraulic fluid line 70 leads to one input to a two-state solenoid-controlled hydraulic valve 100. When the valve 100 is in its first state, the valve 100 connects the hydraulic fluid line 70 with a hydraulic fluid line 102. The hydraulic fluid line 102 leads to an adjustable pressure control valve 104. which is in turn connected through a hydraulic fluid line 106 with a hydraulic fluid pump 108. The hydraulic fluid pump 108 pumps fluid into the hydraulic fluid line 106 from a hydraulic fluid line 110, which leads from a hydraulic fluid reservoir 112.

The cushion signal control line 92 carries the signal CUSHION from the cushion signal control 36 shown in FIGS. 1 and 5 to the adjustable pressure control valve 104. The signal CUSHION has different states. The adjustable pressure control valve 104 responds to the different states of the signal CUSHION by maintaining in the hydraulic fluid line 102—and thus also (when the hydraulic valve 100 is in its first state) in the rear chamber hydraulic fluid line 70 and in the rear chamber 72 —a fluid pressure corresponding to the state of the signal CUSHION. Any excess hydraulic fluid flow from the adjustable pressure control valve 104—which may come from the hydraulic fluid pump 108 or from the rear chamber 72 of the hydraulic cylinder 64—flows through the hydraulic fluid line 114 to the hydraulic fluid reservoir 116.

As also shown in FIG. 6, the front chamber hydraulic fluid line 66 leads to the other input to the two-state solenoid-controlled hydraulic valve 100. When the valve 100 is in its first state, the valve 100 connects the hydraulic fluid line 66 with a hydraulic fluid line 118, which in turn leads to a hydraulic fluid reservoir 120.

The valve 100 also has a second state, in which the valve 100 connects the hydraulic line 70 with the hydraulic line 118 and connects the hydraulic line 66 with the hydraulic line 102. A solenoid 122 controls the state of the valve 100. When the solenoid 122 is not energized, a spring mechanism 101 holds the valve 100 in its first state. When electrical current flows from a positive potential +V through a solenoid control line 126 to the solenoid 122 and from the solenoid 122 over a solenoid control line 128 to ground, the solenoid 122 is energized and overcomes the resisting force of the spring mechanism 101 to shift the valve 100 to its second state. When electrical current ceases to flow across the solenoid 122, the spring mechanism 101 causes the solenoid to shift the valve 100 to its first state.

When the valve 100 is in its first state, the front chamber 68 of the hydraulic cylinder 64 is connected to the reservoir 120. Thus, the front chamber 68 is at a lower pressure than the rear chamber 72. The net force on the piston 60 is controlled by the hydraulic pressure on the piston 60 in the rear chamber 72 of the hydraulic cylinder 64. That pressure is controlled by the state of the signal CUSHION. By controlling the state of the signal CUSHION through the cushion signal control 36, the operator 22 thus modulates the net force on the piston 60 and thus also the force which the piston 60 exerts on the roller support arms 48 and the force which the roller 52 exerts on the tires 40 when the roller 52 contacts the tires 40 as the paver 20 advances over the surface 24. The operator 22 thus also modulates the force which the tires 40 exert on the asphalt paver 20. Thus, when the valve 100 is in its first state, by selecting a state of the signal CUSHION which is appropriate to the conditions, the operator 22 modulates the force of the impact of the roller 52 on the tires 40 so that the dump truck 42 tends not to bounce forward and also so that the asphalt paver 20 continues to lay down a smooth pavement 32 while the roller 52 is impacting the tires 40.

The remaining two control signals—the state of the reset signal control line 98 and the state of the limit switch signal line 88—control the latch and reset features of the invention. When the reset signal control 38 is in the OPERATE position, the hydraulic system unit 90 depicted in FIG. 6 carries out the latch feature when electrical connection is established between lines 84 and 86 by the tripping of the limit switch 82. The hydraulic system unit 90 releases the latching system when the operator 22 moves the reset signal control 38 to the RESET position, opening the electrical contact between lines 94 and 96. The operator 22 prepares the latching system to operate again, after the roller support arm moves to the extended position 78, by moving the reset signal control 38 to the OPERATE position.

The latching system reduces even further the possibility that the truck 42 will bounce ahead from the impact with the paver 20. The force needed to accelerate the truck 42 to the speed at which the paver 20 is moving forward is usually much greater than the force needed to keep the truck 42 moving forward at the same speed as the paver 20 is moving forward. Unless the force applied to the truck 42 is reduced at about the time the truck is moving at the same forward speed as the paver 20, the truck 42 may bounce forward ahead of the paver 20. The invention provides a latching system to reduce the force supplied to the truck when the paver 20 and the tires 40 have been in contact to a sufficient extent to have accelerated the truck 42 to approximately the speed with which the paver 20 is moving forward.

The latching system of one embodiment of the invention uses the limit switch 82 to latch the piston 60 when the roller support arms 48 are forced back to the retracted position 80 by the impact of the roller 52 with the truck tires 40. This latching is controlled by the two-state solenoid-controlled hydraulic valve 100, the state of which is controlled by the solenoid 122.

In the embodiment of the hydraulic system unit depicted schematically in FIG. 6, the solenoid control line 126 is electrically connected to the line 96, which is in turn electrically connected to one of two power inputs to a relay 132. The other power input to the relay 132 is connected to ground. The relay 132 is thus energized when an electrical connection exists between the line 96 and a positive electrical potential. When the relay 132 is not energized, a spring mechanism (not shown) maintains the relay contacts 133 open. When the relay 132 is energized, the relay overcomes the resisting force of the spring mechanism and establishes electrical connection between the relay contacts 133. One of the relay contacts 133 is connected to a positive electrical potential+V, and the other of the relay contacts 133 is electrically connected to the line 94.

As also shown in FIG. 6, the line 94 is connected to the line 86, and the line 84 is connected to the positive electrical potential+V.

From FIG. 6 it will be apparent that the solenoid 122 is energized if, while the reset signal control 38 is in the OPERATE position (which, as shown in FIG. 5, establishes electrical connection between the lines 94 and 96), the limit switch 82 is closed (such as by the movement of the roller support arms 48 to the retracted position 80 resulting from the roller 52 contacting the tires 40). That establishment of electrical connection between the positive potential+V and the solenoid control line 126 also establishes electrical connection between the positive potential+V and one power input to the relay 132, thus energizing the relay 132 and establishing electrical connection between the relay contacts 133.

The electrical connection between the relay contacts 133 establishes a second electrical connection—in parallel to the electrical connection through the line 86, the limit switch 82, and the line 84—between the line 94 and the positive potential+V. That second parallel connection maintains the relay 132 in an energized state, and also maintains the solenoid 122 in an energized state (thus maintaining the valve 100 in its second state), even if for some reason the limit switch 82 were to open and thereby were to open electrical connection between the lines 84 and 86.

With the two parallel electrical connections energizing both the relay 132 and the solenoid 122, the valve 100 is held in its second state. In the second state of the valve 100 the adjustable pressure hydraulic valve 104 maintains a greater hydraulic pressure in the front chamber 68 than in the rear chamber 72 of the hydraulic cylinder 64. This tends to hold the roller support arms 48 in the retracted position 80, preventing the roller 52 from springing forward against the truck tires 40 while they are in contact with the roller 52 and also preventing the roller support arms 48 from springing forward from the retracted position 80 toward or to the extended position 78 when the tires 40 are no longer in contact with the roller 52.

The relay 132 and the solenoid 122 change from non-energized to energized only if the limit switch 82 is closed and the reset signal control 38 is in the OPERATE position. Thus, the valve 100 will not assume its second state—which forces the roller support arms 48 toward the retracted position 80—unless both (a) the operator 22 has set the reset signal control 38 in the OPERATE position and (b) the limit switch 82 is tripped. Such conditions help to guard against unintended or unexpected energizing of the relay 132 and the solenoid 122 with the accompanying change in direction of the force on the roller support arms 48.

When the relay 132 and the solenoid 122 are energized, moving the reset signal control 38 from the OPERATE position to the RESET position opens the electrical connection between the lines 94 and 96 and thereby opens both of the parallel electrical connections to the positive potential+V which maintain both the relay 132 and the solenoid 122 in an energized state. With those parallel electrical connections open, the relay 132 springs back to the state in which its contacts 133 are open, and the solenoid 122 springs back to its first state, which returns the valve 100 to its first state. The hydraulic line 70 then once again leads through valve 100 and hydraulic line 102 to the adjustable pressure control valve 104, and the hydraulic line 66 then once again leads through the valve 100 and the hydraulic line 118 to the hydraulic fluid reservoir 120. The piston 60 can then move forward in hydraulic cylinder 64 in response to the difference in pressure established between the rear chamber 72 and the front chamber 68 by the adjustable pressure control valve 104. As the piston 60 moves to its maximum forward position, the roller support arms 48 will pivot through arc 76 to the extended position 78, the limit switch 82 will open—thus opening electrical connection between lines 84 and 86—and the roller 52 will again be in a position to contact the tires 40 of a dump truck 42 carrying paving material 28. Because the hydraulic latch will not operate until the operator 22 moves the reset signal control 38 to the OPERATE position, the hydraulic latch will not latch until after the operator 22 makes it possible for it to latch.

To prepare the invention for the next contact, the operator 22 then puts the reset signal control 38 in the OPERATE position and uses the cushion signal control 36 to select a value of the signal CUSHION appropriate for this next contact. The piston 60 remains extended until being forced back in the hydraulic cylinder 64 by the next contact.

Those skilled in the art will recognize that the signal CUSHION, the limit switch 82 which controls the connection between lines 84 and 86, and the RESET-OPERATE settings of the reset signal control 38 may be implemented in many different ways and thus may be electrical, hydraulic, or even mechanical without departing from the invention. Those skilled in the art will also readily recognize alternative ways of implementing those signals and of controlling the relationships between those signals.

The invention may also be implemented in embodiments in which hydraulic systems and/or components may replace one or more of the electrical and/or mechanical systems and/or components shown in FIGS. 1 through 6; in which electrical systems and/or components may replace one or more of the hydraulic and/or mechanical systems and/or components shown in FIGS. 1 through 6; or in which mechanical systems and/or components may replace one or more of the hydraulic and/or electrical systems and/or components shown in FIG. 1 through 6. As only one example of such a substitution, FIGS. 7A, 7B and 7C depict a simplified view of part of an embodiment employing a mechanical latch in place of the hydraulic latch depicted in FIGS. 1 through 6. (For clarity FIGS. 7A, 7B and 7C omit the hydraulic cylinder 64 and its associated equipment. The limit switch 82 and its limit switch signal line 88 are unnecessary in the embodiment depicted in FIGS. 7A, 7B and 7C because the embodiment depicted in FIGS. 7A, 7B and 7C employs a mechanical latch.)

FIGS. 7A, 7B and 7C show three different states of the mechanical latch 137. (The mechanical latch 137 comprises the parts numbered 134, 135, 136, 138 and 140, Which are described below.) In FIG. 7A the roller support arms 48 are at the extended position 78. In FIG. 7B the roller support arms 48 are at the retracted position 80 and the mechanical latch has latched. In FIG. 7C the roller support arms 48 are at position 80 with the mechanical latch 137 released; the roller support arms 48 are then free to pivot back to the extended position 78 (shown in broken lines in FIG. 7C).

As shown in FIGS. 7A, 7B and 7C, the paver 20 has a pair of latch arm pivot ears 134, to which one end of a latch arm 136 is connected by a latch arm pivot pin 135 and about which the latch arm 136 is free to pivot. The other end of latch arm 136 has a hook 138. The roller support arm 48 bears a striker 140. The hook 138 and the striker 140 are formed so that, as the hook 138 and the striker 140 approach each other as the roller support arms 48 pivot from position 78 toward position 80, the striker 140 first lifts the hook 138 and thus causes the latch arm 136 to pivot about latch arm pivot pin 135. As the roller support arm 48 moves closer to position 80, the striker 140 moves behind the hook 138, the hook 138 (and thus also the latch arm 136) drops from its lifted position, and the hook 138 then holds the striker 140 so that the roller support arm 48 cannot move from position 80 toward position 78.

The mechanical latch 137 may be released with alternative but equivalent electrical or hydraulic latch release systems. FIGS. 7A, 7B and 7C depict a latch arm solenoid 142 (or, preferably, a hydraulic cylinder 154) mounted on an ear 44. The latch arm solenoid 142 (or hydraulic cylinder 154) has a latch arm solenoid piston 144 (or a hydraulic cylinder piston 156). The latch arm solenoid piston 144 is connected to the armature which moves within the latch arm solenoid 142. Thus, the latch arm solenoid piston 144 is movable by the latch arm solenoid 142. In its retracted position—shown in FIGS. 7A and 7B—the latch arm solenoid piston 144 (or the hydraulic cylinder piston 156) lies below (or does not raise) the latch arm 136. In its extended position—shown in FIG. 7C—the latch arm solenoid piston 144 (or the hydraulic cylinder piston 156) contacts the latch arm 136 and raises it sufficiently that the hook 138 rises above the striker 140. With the latch arm solenoid piston 144 (or the hydraulic cylinder piston 156) extended, the hook 138 no longer restrains the roller support arms 48 from moving toward extended position 78. The position of latch arm solenoid piston 144 (or the hydraulic cylinder piston 156) is controlled by the state of the current in latch arm solenoid control lines 146 and 148 (or by the relative hydraulic pressure in hydraulic fluid lines 158 and 160), which lead to a latch arm solenoid control unit 150 depicted in FIG. 8 (or to a hydraulic latch release control unit 162 depicted in FIG. 10). The latch arm solenoid control unit 150 (or the hydraulic latch release control unit 162) may be located anywhere on paver 20 and is not shown in FIG. 7.

As shown in FIG. 8 the presence or absence of current in the solenoid control lines 146 and 148 is controlled by the presence or absence of electrical connection between the lines 94 and 96. The solenoid control line 148 is connected to ground, and the solenoid control line 146 is connected to line 96. Line 94 is connected to the positive potential +V. Lines 94 and 96 lead from FIG. 8 to the operator station depicted schematically in FIG. 9.

Use of the mechanical latch embodiment shown in FIG. 7 in place of the hydraulic latch as shown in FIGS. 2A through 6 calls for a slightly different control system. One embodiment of such an alternative control system is shown in schematic form in FIG. 9.

FIG. 9 schematically depicts a slightly modified operator's station 34. As shown in FIG. 9, in contrast to the wiring of the reset signal control 38 shown in FIG. 5, for the embodiment having a mechanical latch the reset signal control 38 opens the electrical connection between lines 94 and 96 when in the OPERATE position and closes that electrical connection when in the RESET position. The lines 94 and 96 lead to the latch arm solenoid control unit 150 shown in FIG. 8 or to the hydraulic latch release control unit 162 shown in FIG. 10. The cushion signal line 92 leads from the operator's station 34 of FIG. 9 to the simplified hydraulic system unit 164, shown in FIG. 11 and described below, which may be used with the mechanical latch.

As shown in FIGS. 8 and 9 the latch arm solenoid control line 146 is connected to the positive potential V only when the reset signal control 38 shown in FIG. 9 is in the RESET position, which forms an electrical connection between lines 94 and 96 and thus connects line 96 to the positive potential +V. With line 146 also thereby connected to the positive potential +V, current flows through the latch arm solenoid 142, causing the latch arm solenoid piston 144 to rise and to lift the latch arm 136 so that the hook 138 rises above the striker 140. This frees the roller support arms 48 to pivot toward the extended position 78. When the reset signal control 38 shown in FIG. 9 is in the OPERATE position, there is no electrical connection between lines 94 and 96; the latch arm solenoid control line 146 is not connected to the positive potential +V; no current flows through the latch arm solenoid 142; the latch arm solenoid piston 144 returns to or remains in a retracted position under the force of a spring (not shown) and/or the weight of the latch arm 136; and the latch arm 136 is able to return to, or to remain in, its lowered position.

In the embodiment shown in FIG. 7 having a hydraulic latch release system for the mechanical latch 137 the line 158 is a hydraulic fluid line leading to the front chamber (not separately shown in FIG. 7) of the hydraulic cylinder 154, and the line 160 is a hydraulic fluid line leading to the rear chamber (not separately shown in FIG. 7) of the hydraulic cylinder 154. The line 160 supplies hydraulic fluid and hydraulic pressure tending to cause the hydraulic piston 156 to extend from the hydraulic cylinder 154, and line 158 conveys hydraulic fluid to and from the front chamber of the hydraulic cylinder 154 in response to the movement of the piston 156.

FIG. 10 schematically depicts the hydraulic latch release control unit 162 used with the hydraulic latch release alternative of FIGS. 7A, 7B and 7C. As shown in FIG. 10 the lines 94 and 96 lead from the reset signal control 38 shown in FIG. 9. Line 94 leads to a positive potential +V, and line 96 leads to one terminal of a solenoid 172. The other terminal of the solenoid 172 is connected through line 166 to ground. When electrical connection does not exist between line 94 and line 96—that is, when the reset signal control 38 is in the OPERATE position shown in FIG. 9—solenoid 172 is not energized. When electrical connection does exist between line 94 and line 96—that is, when the reset signal control 38 is in the RESET position shown in FIG. 9—the solenoid 172 is energized.

The solenoid 172 controls the state of a two-state hydraulic valve 176. Hydraulic fluid line 158 leads from the front chamber of the hydraulic cylinder 154 shown in FIG. 7 to one input to the valve 176; hydraulic fluid line 160 leads from the rear chamber of the hydraulic cylinder 154 to the other input to the valve 176.

In its first state—the state in which the solenoid 172 is not energized and the valve 176 is held in its first state by the spring 182—the valve 176 connects the hydraulic fluid line 158 to fluid line 184, which in turn leads to a hydraulic fluid pump 186, which pumps hydraulic fluid through fluid line 190 from the reservoir 192 into the line 184. In its first state the valve 176 also connects the hydraulic fluid line 160 with fluid line 178, which leads to fluid reservoir 180.

Thus, when solenoid 172 is not energized, and the valve 176 is thus in its first state, hydraulic fluid flows freely from the rear chamber of the hydraulic cylinder 154 to the reservoir 180 and to the front chamber of the hydraulic cylinder 154 under pressure from the pump 186. These flows of hydraulic fluid hold the hydraulic cylinder piston 156 in a retracted position or (if the piston 156 is in an extended position) assist the hydraulic cylinder piston 156 in retracting to the retracted position under the weight of the latch arm 136.

These are the conditions appropriate to the OPERATE setting of the reset signal control 38 shown in FIG. 9. With the piston 156 in its retracted position, the mechanical latch will latch on the next contact between the roller 52 and the tires 40 and, if the latch is already latched, the latch will remain latched.

When the solenoid 172 is energized, the solenoid 172 overcomes the resistance of the spring 182 and moves the valve 176 to its second state. In that second state the valve 176 connects the hydraulic fluid line 158 (which leads from the front chamber of the hydraulic cylinder 154) to fluid line 178 (which leads to the reservoir 180) and connects the hydraulic fluid line 160 (which leads from the rear chamber of the hydraulic cylinder 154) to the line 184, which leads to the hydraulic pump 186. These hydraulic connections cause the piston 156 to move to an extended position in response to the difference in pressure between the rear and front chambers of the hydraulic cylinder 154. (Because of the open connection through the hydraulic fluid line 158 and the valve 176 between the rear chamber and the reservoir 180, the hydraulic fluid in the front chamber of the hydraulic cylinder 154 is at a lower pressure than the hydraulic fluid in the rear chamber of the hydraulic cylinder 154.)

These are the conditions appropriate to the RESET position of the reset signal control 38 shown in FIG. 9. As the piston 156 moves to an extended position, it lifts the latch arm 136 and thus also lifts the hook 138 above the striker 140. This in turn releases the mechanical latch 137 and permits the roller support arms 48 to pivot back to the extended position 78. Thus, by moving the reset signal control 38 to the RESET position, the operator 22 releases the mechanical latch and thus enables the roller 52 to reset in the appropriate position for again contacting the tires 40 of a dump truck 42 carrying paving material.

The mechanical latch 137 depicted in FIGS. 7A, 7B and 7C—whether the latch release for that mechanical latch is a solenoid or a hydraulic cylinder—has the advantage of permitting a simplification of the hydraulic system unit 90 shown in FIG. 6.

FIG. 11 shows a simplified hydraulic system unit 164 which may be used with the mechanical latch 137 shown in FIGS. 7A, 7B and 7C. As shown in FIG. 11, the front chamber hydraulic fluid line 66 leads through fluid line 118 to the hydraulic fluid reservoir 120. The rear chamber hydraulic fluid line 70 leads directly to the adjustable pressure control valve 104, to which cushion signal control line 92 carries the signal CUSHION from the operator's station 34 shown in FIG. 9. The other numbered elements in FIG. 11 are the same as the correspondingly-numbered elements in FIG. 6.

With the mechanical latch 137 and the simplified hydraulic system unit 164 shown in FIG. 11 the operator 22 controls the operation of the invention as follows. With the roller support arms 48 in the extended position 78, the operator 22 places the reset signal control 38 shown in FIG. 9 in the OPERATE position and uses the cushion signal control 36 to select an appropriate value for the signal CUSHION. He then drives the paver 20 ahead toward the tires 40 of a waiting dump truck 42. As the roller support arms 48 are forced back from extended position 78 toward retracted position 80 by the contact of the roller 52 with the tires 40, the latch arm 136 is first lifted by the striker 140 and then falls back, with the hook 138 latching the striker 140 and thus also latching the roller support arms 48 in the retracted position 80. The adjustable pressure control valve 104 continues to maintain pressure in rear chamber 72, but the roller support arms 48 do not recoil against the truck tires 40 because the engagement between the hook 138 and the striker 140 prevents the roller support arms 48 from moving forward from their retracted position 80.

When the load of paving material is dumped into the hopper 26, and the dump truck 42 pulls ahead, the operator 22 moves the reset signal control 38 shown in FIG. 9 to the RESET position; the latch arm solenoid piston 144 (or alternatively the hydraulic cylinder piston 156) extends, lifting latch arm 136 and thus also lifting hook 138 above striker 140; and the hydraulic pressure in rear chamber 72 causes the piston 60 to extend the roller support arms 48 to the extended position 78. (Before selecting the RESET position of the reset signal control 38 the operator 22 may reduce the pressure in rear chamber 72 by adjusting the cushion signal control 36, or a suitable damping means may be provided to prevent an uncontrolled forward swing of roller support arms 48.) The operator 22 then places the reset signal control 38 shown in FIG. 9 in the OPERATE position, thus lowering the latch arm solenoid piston 144 (or alternatively the hydraulic cylinder piston 156) and the latch arm 136 and preparing the invention for another contact with the tires 40 of a dump truck 42. (If the operator 22 has reduced the pressure in rear chamber 72 to move the roller support arms 48 to the extended position 78, the operator 22 will adjust the cushion signal control 36 to a value appropriate to the next contact before that contact occurs.)

Those skilled in the art will appreciate that the embodiments shown here may be modified without departing from the invention and that, as noted above, hydraulic, electrical, and mechanical systems and/or components may be freely substituted in ways other than the ways shown in FIGS. 7 through 11 without departing from the invention.

Thus, although particular alternative embodiments are described above, those embodiments are only examples of the invention. Numerous changes in the embodiments described above may be made without departing from the spirit and scope of the invention, which is defined by the following claims.

I claim:

1. A device for cushioning a contact between a travelling self-propelled paving machine equipped with a hopper for receiving paving material and a truck carrying paving material to be deposited in the hopper, the truck being equipped with a tire, the device comprising:
   A. contacting means, connected to the paving machine, for contacting the truck and for applying to the truck a force tending to move the truck in a direction in which the paving machine is travelling, the contacting means movable between an extended position for initially contacting the truck and a retracted position;
   B. cushioning means, connected to the contacting means and to the paving machine, for cushioning the force applied to the truck and the force applied to the paving machine by the contact between the contacting means and the truck;
   C. latch means, connected to one of the paving machine and the contacting means, for latching the contacting means in the retracted position, the latch means having a latched state and an unlatched state; and D. restoring means, connected to the contacting means and to the paving machine, for restoring the contacting means to the extended position.

2. The device of claim 1 wherein the latch means comprises:
   A. a hydraulic cylinder connected to one of the paving machine and the contacting means;
   B. a piston movable within the hydraulic cylinder, the piston having a free end, the free end of the piston connected to the other of the paving machine and the contacting means;
   C. restraining means for restraining the piston from moving within the hydraulic cylinder, the restraining means having an inactive state in which the restraining means permits the piston to move within the hydraulic cylinder and an active state in which the restraining means restrains the piston from moving within the hydraulic cylinder; and
   D. means for placing the restraining means in the active state in response to the movement of the contacting means to the retracted position.

3. The device of claim 1, further comprising:
   A. a latch release control disposed to be operable by the operator of the paving machine; and
   B. latch release control means, connected to the latch means, for placing the latch means in the unlatched state in response to a signal from the latch release control.

4. The device of claim 1 wherein the contacting means comprises:
   A. a roller arm having a first end and a second end, the first end of the roller arm pivotally mounted on the paving machine, the roller arm pivoting through an arcuate path between a first path end and a second path end, the roller arm connected to the cushioning means; and
   B. a roller mounted on the second end of the roller arm, the first path end in a location at which the roller is in the extended position, and the second path end in a location at which the roller is in the retracted position.

5. The device of claim 2, further comprising:
   A. a restraint control disposed to be operable by the operator of the paving machine; and
   B. restraint control means, connected to the restraining means, for placing the restraining means in the inactive state in response to a signal from the restraint control.

6. The device of claim 4 wherein the latch means comprises:
   A. a striker mounted on one of the paving machine and the roller arm; and
   B. a latch arm having first and second ends, the first end of the latch arm pivotally mounted on the other of the paving machine and the roller arm, the second end of the latch arm defining a hook, the striker and the hook formed and mounted so that the hook is lifted by the striker as the roller arm swings from the first path end toward the second path end and so that the hook retains the striker when the roller arm reaches the second path end.

7. A device for cushioning a contact between a travelling self-propelled paving machine equipped with a hopper for receiving paving material and a truck carrying paving material to be deposited in the hopper, the truck being equipped with a tire, the device comprising:
   A. contacting means, connected to the paving machine, for contacting the truck and for applying to the truck a force tending to move the truck in the direction in which the paving machine is travelling, the contacting means movable between an extended position for initially contacting the truck and a retracted position;
   B. cushioning means, connected to the contacting means and to the paving machine, for cushioning the force applied to the truck and the force transmitted to the paving machine by the contact between the contacting means and the truck;
   C. force modulating means, connected to the cushioning means and to the paving machine, for modulating the force applied to the truck and the force applied to the paving machine by the contact between the contacting means and the truck; and
   D. restoring means, connected to the contacting means and to the paving machine, for restoring the contacting means to the extended position.

8. The device of claim 7 wherein the force modulating means comprises:
   A. a hydraulic cylinder; and
   B. a piston movable within the hydraulic cylinder, the piston defining a front chamber and a rear chamber within the hydraulic cylinder, the front chamber containing hydraulic fluid a-t a first pressure, and the rear chamber containing hydraulic fluid at a second pressure; and
   C. pressure modulating means for modulating the difference between the first pressure and the second pressure.

9. The device of claim 7, further comprising:
   A. a force modulating control disposed to be operable by the operator of the paving machine; and
   B. force modulating control means, connected to the force modulating means, for controlling the extent to which the force modulating means modulates the force applied to the truck and the force applied to the paving machine by the contact between the contacting means and the truck, the force modulating control means responsive to a signal from the force modulating control.

10. The device of claim 7, further comprising latch means, connected to one of the paving machine and the contacting means, for latching the contacting means in the retracted position, the latch means having a latched state and an unlatched state.

11. The device of claim 8, further comprising:
A. a pressure modulating control disposed to be operable by the operator of the paving machine; and
B. pressure modulating control means, connected to the pressure modulating means, for controlling the extent to which the pressure modulating means modulates the difference between the first pressure and the second pressure, the pressure modulating control means responsive to a signal from the pressure modulating control.

12. The device of claim 10 wherein the latch means comprises:
A. a hydraulic cylinder connected to one of the paving machine and the contacting means;
B. a piston movable within the hydraulic cylinder, the piston having a free end, the free end of the piston connected to the other of the paving machine and the contacting means;
C. restraining means for restraining the piston from moving within the hydraulic cylinder, the restraining means having an inactive state in which the restraining means permits the piston to move within the hydraulic cylinder and an active state in which the restraining means restrains the piston from moving within the hydraulic cylinder; and
D. means for placing the restraining means in the active state in response to the movement of the contacting means to the retracted position.

13. The device of claim 10 further comprising:
A. a latch release control disposed to be operable by the operator of the paving machine; and
B. latch release control means, connected to the latch means, for placing the latch means in the unlatched state in response to a signal from the latch release control.

14. The device of claim 12, further comprising:
A. a restraint control disposed to be operable by the operator of the paving machine; and
B. restraint control means, connected to the restraining means, for placing the restraining means in the inactive state in response to a signal from the restraint control.

15. The device of claim 10 wherein the contacting means comprises:
A. a roller arm having a first end and a second end, the first end of the roller arm pivotally mounted on the paving machine, the roller arm pivoting through an arcuate path between a first path end and a second path end, the roller arm connected to the cushioning means; and
B. a roller mounted on the second end of the roller arm, the first path end in a location at which the roller is in the extended position, and the second path end in a location at which the roller is in the retracted position.

16. The device of claim 15 wherein the latch means comprises:
A. a striker mounted on one of the paving machine and the roller arm; and
B. a latch arm having a first end and a second end, the first end of the latch arm pivotally mounted on the other of the paving machine and the roller arm, the second end of the latch arm defining a hook, the striker and the hook formed and mounted so that the hook is lifted by the striker as the roller arm swings from the first path end toward the second path end and so that the hook retains the striker when the roller arm reaches the second path end.

17. The device of claims 1 or 7 wherein the cushioning means comprises a hydraulic cylinder.

18. The device of claims 1 or 7 wherein the restoring means comprises a hydraulic cylinder.

19. The device of claims 1 or 7, further comprising:
A. a restoring control disposed to be operable by the operator of the paving machine; and
B. restoring control means, connected to the restoring means, for actuating the restoring means to restore the contacting means to the extended position in response to a signal from the restoring control.

20. The device of claim 1 or 7 wherein the contacting means is adapted to contact a tire of the truck.

21. The device of claim 6 or 16 wherein the latch means further comprises:
A. a solenoid;
B. a latch release piston movable by the solenoid, the latch release piston having a retracted position and an extended position, the retracted piston position permitting the hook to retain the striker, and the extended piston position holding the latch arm in a position in which the hook does not retain the striker;
C. a latch release piston control; and
D. means, responsive to the latch release piston control, for placing the latch release piston in one of the extended piston position and the retracted piston position.

22. The device of claims 6 or 16 wherein the latch means further comprises:
A. a hydraulic cylinder;
B. a latch release piston movable within the hydraulic cylinder, the latch release piston having a retracted position and an extended position, the retracted piston position permitting the hook to retain the striker, the extended piston position holding the latch arm in a position in which the hook does not retain the striker;
C. a latch release piston control; and
D. means, responsive to the latch release piston control, for placing the latch release piston in one of the extended piston position and the retracted piston position.

23. The device of claim 6 or 16 wherein the latch means further comprises:
A. a solenoid;
B. a latch release piston movable by the solenoid, the latch release piston having a retracted position and an extended position, the retracted piston position permitting the hook to retain the striker, and the extended piston position holding the latch arm in a position in which the hook does not retain the striker;
C. a latch release piston control, disposed to be operable by the operator of the paving machine; and
D. means, responsive to the latch release piston control, for placing the latch release piston in one of the extended piston position and the retracted piston position.

24. The device of claim 6 or 16 wherein the latch means further comprises:
A. a hydraulic cylinder;
B. a latch release piston movable within the hydraulic cylinder, the latch release piston having a retracted position and an extended position, the retracted piston position permitting the hook to retain the striker, the extended piston position holding the latch arm in a position in which the hook does not retain the striker;

C. a latch release piston control, disposed to be operable by the operator of the paving machine; and
D. means, responsive to the latch release piston control, for placing the latch release piston in one of the extended piston position and the retracted piston position.

* * * * *

UNITED STATES PATENT AND TRADEMARK OFFICE
CERTIFICATE OF CORRECTION

PATENT NO. : 4,955,754

DATED : September 11, 1990

INVENTOR(S) : Donald W. Smith

Page 1 of 2

It is certified that error appears in the above-identified patent and that said Letters Patent is hereby corrected as shown below:

On the title page item [56]:
   In the list of References Cited, U.S. Patent No. 4,818,139 should be identified as --Brock et al............... 404/81--.

In the list of References Cited, in the last line of the first column, "Barber-Green" should read --Barber-Greene--.

In the list of References Cited, in the second line of the second column, "Screed" should read --Screeds--.

In the abstract, lines 6, 7, 8, and 9 should read as follows:

--connected to the paving machine; the other end of the arm bears a roller for contacting the tires of the truck. The arm is connected to the piston of a hydraulic cylinder system; as the roller contacts the truck tires, the--.

In Column 3, lines 51 and 52, "pave-r" should read --paver--.

In Column 5, line 15 should read as follows: --with FIGS. 5, 6, 8, 9, 10, and 11.--.

In Column 5, line 47, "52" should read --52.--.

In Column 7, line 29, "104." should read --104,--.

In Column 11, line 1, "Which" should read --which--.

In Column 12, line 19, "potential V" should read --potential +V--.

UNITED STATES PATENT AND TRADEMARK OFFICE
CERTIFICATE OF CORRECTION

PATENT NO. : 4,955,754

DATED : September 11, 1990

INVENTOR(S) : Donald W. Smith

It is certified that error appears in the above-identified patent and that said Letters Patent is hereby corrected as shown below:

In Column 15, line 23, after the word "and" the material beginning with "D." should be printed as a separate paragraph like "A.," "B.," and "C.".

In Column 16, line 49, "a-t" should read --at--.

Signed and Sealed this

Fifth Day of May, 1992

Attest:

DOUGLAS B. COMER

Attesting Officer

Acting Commissioner of Patents and Trademarks